(12) United States Patent
Yim et al.

(10) Patent No.: US 10,019,298 B2
(45) Date of Patent: Jul. 10, 2018

(54) MIDDLEWARE INTERFACE AND MIDDLEWARE INTERFACE GENERATOR

(71) Applicant: Google Inc., Mountain View, CA (US)

(72) Inventors: Keun Soo Yim, San Jose, CA (US); Iliyan Malchev, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/239,315

(22) Filed: Aug. 17, 2016

(65) Prior Publication Data

US 2018/0052723 A1    Feb. 22, 2018

(51) Int. Cl.
G06F 9/54 (2006.01)
G06F 8/41 (2018.01)

(52) U.S. Cl.
CPC .......... *G06F 9/548* (2013.01); *G06F 8/41* (2013.01); *G06F 9/545* (2013.01)

(58) Field of Classification Search
None
See application file for complete search history.

(56) References Cited

U.S. PATENT DOCUMENTS

| | | | |
|---|---|---|---|
| 6,167,442 A | 12/2000 | Sutherland et al. | |
| 6,192,418 B1 | 2/2001 | Hale et al. | |
| 7,111,077 B1 | 9/2006 | Starkovich et al. | |
| 7,242,929 B2 | 7/2007 | Draluk et al. | |
| 7,367,020 B2 | 4/2008 | Bickle et al. | |
| 7,428,728 B2 | 9/2008 | Tewksbary et al. | |
| 7,546,309 B1 | 6/2009 | Michel et al. | |
| 7,707,594 B1 * | 4/2010 | Foster | G06F 9/5055 709/201 |
| 7,810,105 B2 | 10/2010 | Prabandham et al. | |
| 7,831,724 B2 | 11/2010 | Bailey et al. | |
| 8,555,280 B2 | 10/2013 | Kwak et al. | |
| 2007/0130570 A1 * | 6/2007 | Paniscotti | G06F 9/465 719/311 |
| 2015/0295844 A1 | 10/2015 | Perreira et al. | |

FOREIGN PATENT DOCUMENTS

WO    2013/143121 A1    10/2013

OTHER PUBLICATIONS

International Search Report and Written Opinion for PCT Patent Application No. PCT/US2017/047083, dated Nov. 10, 2017, 14 pages.

* cited by examiner

*Primary Examiner* — Syed Roni
(74) *Attorney, Agent, or Firm* — Brake Hughes Bellermann LLP

(57) ABSTRACT

A computer system exposes a hardware access library providing an interface for commanding an input/output device of the computer system. The computer system launches an agent process that can receives a request from a remote process to command the I/O device. The agent process invokes a first call to a middleware driver, the middleware driver invokes a second call to the client proxy, and the client proxy invokes a third call to a server stub, and the server stub accesses the input/output device responsive to receiving the third call via the hardware access library.

16 Claims, 11 Drawing Sheets

US 10,019,298 B2

MIDDLEWARE INTERFACE AND MIDDLEWARE INTERFACE GENERATOR

TECHNICAL FIELD

The following disclosure relates to the technical field of operating platforms and/or operating systems.

BACKGROUND

An operating platform for a computing device can include two layers: a system layer and a framework layer. The system layer can include an operating system kernel, libraries for accessing functionality of the operating system kernel, and an abstraction layer for interfacing with hardware. The framework layer can include services that can be used by applications executing on the operating platform and the applications. In some applications, the operations performed by the system layer and the framework layer are split among computing systems. For example, the system layer's operations may be performed by a mobile device, while the framework layer operations are performed by a server in a cloud computing configuration.

When the system and framework layers execute on separate computing devices, components of the framework layer may communicate with components of the system layer via custom streaming channels implemented in the framework layer.

SUMMARY

In one aspect, a method for creating a middleware interface for an operating platform includes accessing a file describing an interface definition and generating a server stub for communicating with a hardware access library of the operating platform based on the interface definition. The hardware access library can provide access to hardware of a computing device executing the operating platform. The method can also include generating a client proxy for communicating with a server stub based on the interface definition and generating a middleware interface specification based on the interface definition. The middleware interface specification can include one or more control flows, and the one or more control flows can include function operation descriptions for allowing a process to access the hardware of the computing device. The method can also include generating, using the middleware interface specification, a middleware driver for communicating with the client proxy, the middleware driver also in communication with an agent for receiving communications from a plurality of processes.

Various implementations of this aspect may include one or more of the following features. In some implementations, the operating platform includes the agent. In some implementations, at least one of the plurality of processes are executed on the computing device, and in some implementations at least one of the plurality of processes are executed by a remote computer system different from the computer system. In some implementations, the first complier performs generating the server stub, generating the client proxy and generating the middleware interface specification, and a second complier performs the generating the middleware driver. In some implementations, the method also includes deploying the server stub, the client proxy, and the middleware driver to the computing device executing the operating platform. The operating platform may be an open source platform.

Other embodiments of this aspect include corresponding computer systems, apparatus, and computer programs recorded on one or more computer storage devices, each configured to perform the operations of the method summarized above.

In another aspect, a system includes a first processor, an input/output device, and, a memory storing instructions that when executed by the first processor cause the first processor to perform operations including exposing a hardware access library providing access to an interface for commanding the input/output device and launching an agent process for receiving a request from a remote process to command the input/output device. The operations can also include instantiating a middleware driver, instantiating a client proxy, instantiating a server stub, and commanding the input/output device responsive to the server stub accessing the interface. In some implementations the agent process invokes a first call to the middleware driver responsive to the receiving of the request from the remote process, the middleware driver invokes a second call to the client proxy responsive to receiving the invocation of the first call, the client proxy invokes a third call to a server stub responsive to receiving the invocation of the second call, and the server stub for accesses the input/output device responsive to receiving the third call.

Various implementations of this aspect can include, for example, the first processor executing the remote process or a second processor of a remote computer system executing the remote process. In some implementations, the client proxy, the server stub, and a middleware interface specification are generated based on an interface definition, and the middleware driver is generated based on middleware interface specification. In some implementations, the instructions stored in the memory further cause the first processor to perform operations including invoking a fourth call on the server stub responsive to a request transmitted from the input/output device to the hardware access library, invoking a fifth call on the client proxy responsive to the invocation of the fourth call, and invoking a sixth call on the middleware proxy responsive to the invocation of the fifth call. The operations may also include communicating, via the agent process, a message to the remote process responsive the invocation of the sixth call.

Other embodiments of this aspect include corresponding methods configured to perform the operations of the processor of the regression testing system according to the instructions stored in the regression testing system's memory.

In another aspect, a method for accessing hardware of a remote computing device includes receiving from the remote computing device, a middleware interface specification and dynamically generating a class based on the middleware interface specification using reflection. The class can include a method that when invoked generates a remote procedure call to an agent process executing on the remote computing device, and the remote procedure call can cause the agent process to access a hardware abstraction layer of the remote computing device. The method can also include invoking the method of the class.

In some implementations of this aspect, the middleware interface specification is based on an interface definition used to generate a client proxy and a server stub on the remote computing device, and the client proxy can expose a first application programming interface for accessing the server stub. In some implementations, the server stub can expose a second application programming interface for accessing the hardware abstraction layer of the remote computing device. The middleware interface specification can include a control flow for the method, a range of expected values for the method, or can be received from the agent process executing on the remote computing device according to some implementations.

Other embodiments of this aspect include corresponding computer systems, apparatus, and computer programs recorded on one or more computer storage devices, each configured to perform the operations of the method summarized above.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

The use of custom streaming channels between the system layer and the framework layer can cause compatibility issues if the application programming interface (API) for the system layer changes because the custom streaming channels will no longer be compatible and will need to be rewritten and/or redesigned to accommodate the updated system layer API.

Accordingly, the present disclosure describes a middleware interface. In some implementations, the middleware interface can be automatically generated. It can interface between the system layer (or lower layer) and the framework layer (or upper layer) of the operating platform without the need for custom streaming channels or other application specific communication mechanisms by providing a consistent interface between the system layer and the framework application layer.

According to some embodiments, the middleware interface is generated using a hardware abstraction layer interface definition language (or "HIDL"). A first complier accesses a hardware abstraction layer interface definition language file corresponding with a hardware abstraction layer (or a hardware access library that is part of the hardware abstraction layer). The first complier generates a server stub, a client proxy, and middleware interface specification. The server stub can interface with the hardware abstraction layer on a first computing device. The client proxy can communicate with the server stub to allow one or more processes access to hardware of the first computing device. The middleware interface specification includes a control flow describing the operation of functions of an application that accesses the hardware of the computer device. A second complier accesses the middleware interface specification to generate a middleware driver that can be read by an agent process executing on the first computing device. The agent process can communicate one or more remote processes.

During operation, the agent process receives a remote call for accessing the hardware. The agent process invokes a function in the middleware driver corresponding to the received remote call. The middleware driver then invokes a function in the client proxy to implement one or more operations required to satisfy the remote call. The client proxy invokes a function on the server stub implementing functionality needed to respond to the call from the middleware driver. The server stub invokes a portion of the hardware abstraction layer in response to the call from the client proxy.

In one implementation, the agent process provides the middleware interface specification to a test runner process. The test runner process generates, at runtime, classes with methods that when called, result in invocation of one or more functions in the hardware abstract layer.

Figure 1A:
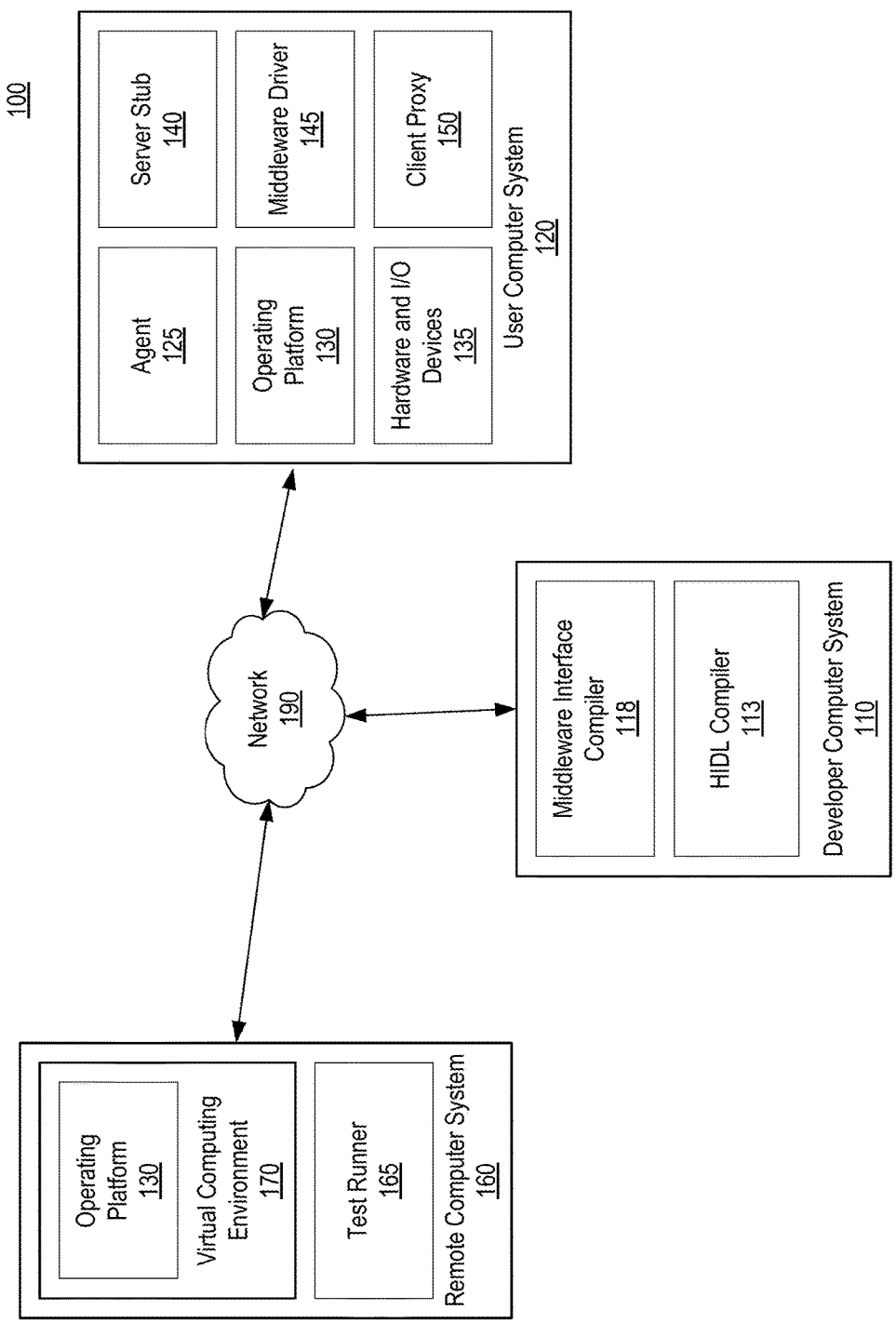
FIGS. 1A-1B show an example system and network for middleware interface use and generation consistent with disclosed embodiments.

FIG. 1 illustrates, in block form, system 100 for middleware interface use and generation consistent with disclosed embodiments. In the embodiment illustrated in FIG. 1, developer computer system 110, user computer system 120, and remote computer system 160 can communicate using network 190.

System 100 outlined in FIG. 1 can be computerized, wherein each of the illustrated components comprises a computing device that is configured to communicate with other computing devices via network 190. For example, developer computer system 110 can include one or more computing devices, such as a desktop, notebook, or handheld computing device that is configured to transmit and receive data to/from other computing devices via network 190. Similarly, user computer system 120 and remote computer system 160 can include one or more computing devices that are configured to communicate data via the network 190. In some embodiments, user computer system 120 can be a general-purpose computer system operated by an end-user. For example, user computer system 120 can be a desktop, notebook, mobile device, or handheld computing device that can perform general-purpose computing tasks such as sending and receiving email, browsing the Internet, word processing functions, spreadsheet functions, and the like. In some embodiments, user computer system 120 can be a mobile device with telephone capabilities. In some embodiments, remote computer system 160 can be a mobile device, smart phone, or other handheld computing device. In some embodiments, remote computer system 160 can be a server, server network, or multiple computing systems. For example, remote computer system 160 can include one or more servers or computing clusters. In some embodiments, these computing systems can be implemented using one or more computing devices dedicated to performing the respective operations of the systems as described herein.

According to some embodiments, developer computer system 110 performs one or more functions and/or operations to generate stubs and proxies used for middleware interface communication. For example, developer computer system 110 can include HIDL compiler 113 and middleware interface compiler 118. In some embodiments, HIDL compiler 113 can accept as input a file or data structure written in a programming language that HIDL compiler 113 uses to generate server stub 140 and client proxy 150. In some embodiments, the input file accepted by HIDL compiler 113 is written in a hardware abstraction layer interface definition language, or HIDL (described in more detail below with respect to FIG. 3).

According to some embodiments, HIDL compiler 113 can also create an output file that is used by middleware interface compiler 118. Middleware interface compiler 118 can generate middleware driver 145 from the output file of HIDL compiler 113 according to some embodiments. The output file can include a middleware interface specification that describes the functions of the middleware interface, their control flow, and their normal values (as described in more detail below with respect to FIG. 3).

In some embodiments, developer computer system 110 generates one or more server stubs 140, middleware drivers 145, and client proxies 150 and communicates them to user computer system 120. In some embodiments, server stub 140, middleware driver 145, and client proxy 150 are packaged and deployed to user computer system 120 as part of operating platform 130. In some embodiments, developer computer system 110 communicates server stub 140, middleware driver 145, and client proxy 150 to user computer system 120 separately from operating platform 130.

According to some embodiments, user computer system 120 can include agent 125, operating platform 130, hardware and I/O devices 135, and one or more server stubs 140, middleware drivers 145 and client proxies 150. In some embodiments, agent 125 is an executable process that manages communications between remote processes and local proxies and stubs. For example, agent 125 may open one or more TCP ports and manage communication between user computer system 120 and remote computer system 160 via the one or more TCP ports. Agent 125 can also communicate with middleware driver 145 in some embodiments. As discussed in greater detail below, events triggered from user input to hardware and I/O devices 135 can result in the invocation of a function in server stub 140, which can result in the invocation of a function call in client proxy 150, which can also result in the invocation of a function in middleware driver 145. Middleware stub 145 may make a call to agent 125 which then can make a remote process call to remote computer system 160, for example.

Figure 2:
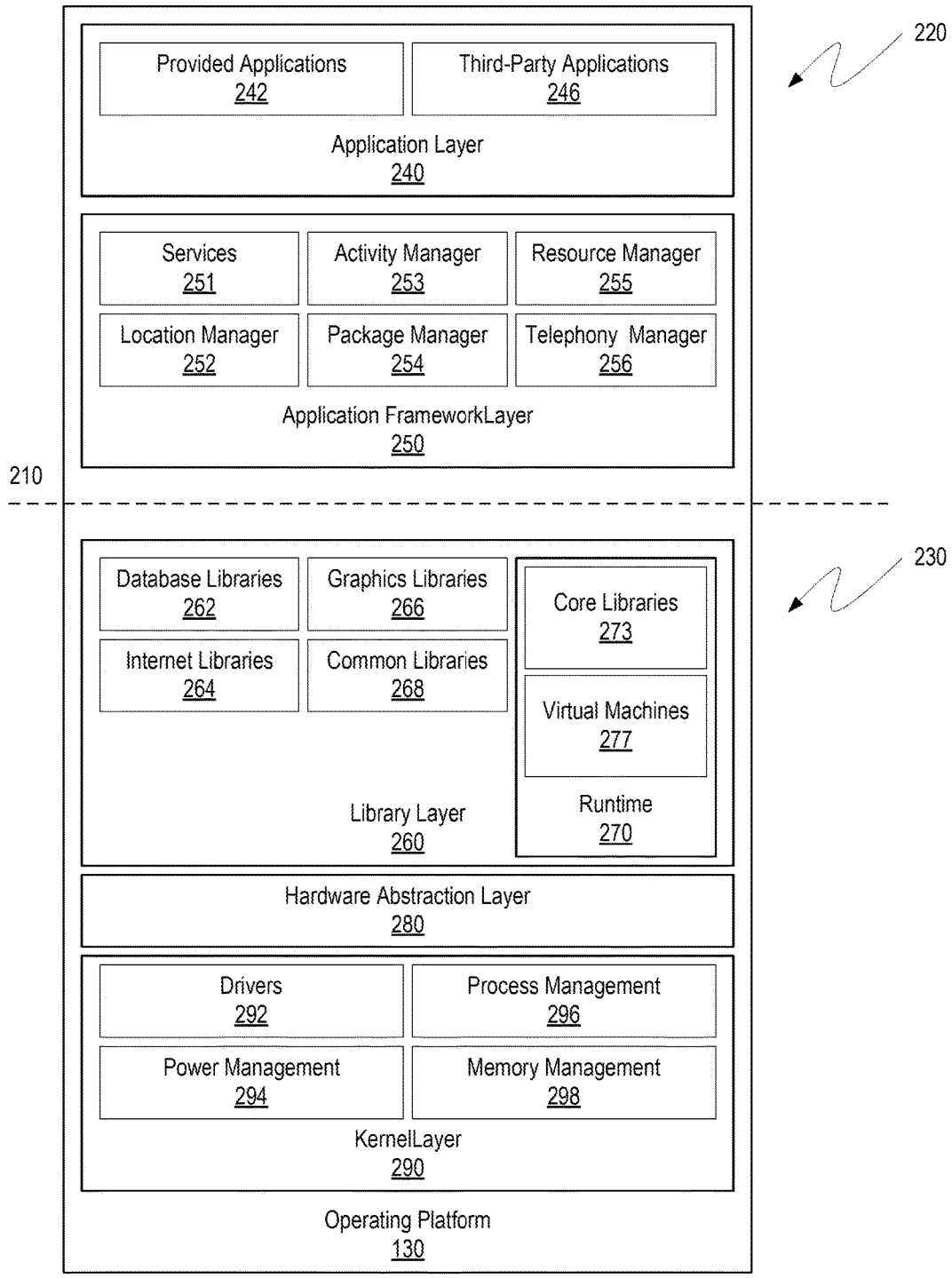
FIG. 2 shows an example architecture for an operating platform consistent with disclosed embodiments.

In some embodiments, user computer system 120 includes operating platform 130. FIG. 2 shows an example architecture diagram for operating platform 130 consistent with disclosed embodiments. In some embodiments, operating platform 130 can be an open source operating platform—the source code for the operating platform may be available to third parties installing the operating platform on computing devices and/or the public. Operating platform 130 can include, in some embodiments, a general-purpose operating system executing on a general-purpose computing device such as a laptop, desktop, or other general-purpose computing device, or a mobile computing device such as a mobile phone, smartphone, or tablet computing device. Operating platform 130 may support basic functions of the computing device such as scheduling tasks, executing applications, controlling peripheral devices, and/or managing resources of the general-purpose computing device.

In some embodiments, operating platform 130 includes several abstraction layers which can be divided into upper abstraction layers and lower abstraction layers. For example, operating platform 130 as shown in FIG. 2, is divided along line 210 into an upper abstraction layer, or framework layer 220, and a lower abstraction layer, or system layer 230.

In some embodiments, framework layer 220 can include two sublayers, for example, application layer 240 and application framework layer 250. Applications layer 240 can include, in some embodiments, an application or user space in which user applications such as provided applications 242 and third-party applications 246 execute. For example, provided applications 242 can include applications such as an email client, a phone application, a web browser application, and/or a notetaking application. Third-party applications 246 can include applications that a user downloads and installs from third-party application providers. Third-party applications 246 can include, for example, word processing applications, spreadsheet applications, social media applications, and games. In some embodiments, users of the computing device executing operating platform 130 have direct access to the functionality of application layer 240.

According to some embodiments, applications installed within application layer 240 can interface with services or managers in application framework layer 250 to access functionality provided by system layer 230. Users, in some embodiments, may not access application framework layer 250, but rather, may access it indirectly through the applications of application layer 240. For example, application framework layer 250 can include various services 251 that can be used by applications installed in application layer 240, such as input output services, Bluetooth services, or database services as just some examples. In some embodiments, application framework layer 250 may also include various managers such as location manager 252 activity manager 253, package manager 254, resource manager 255, and telephony manager 256 which may manage one or more background processes (e.g., processes without a user interface). For example, location manager 252 may provide an API that provides applications executing within application layer 240 with location information (such as GPS coordinates) regarding the current location of the device executing operating platform 130. Activity manager 253, for example, may provide information to applications executing within application layer 240 regarding threads, processes or other resources of the device executing operating platform 130. Package manager 254, in some embodiments, may provide functionality for installing, uninstalling, upgrading, or configuring applications installed within application layer 240. In some embodiments, resource manager 255 may provide functionality for managing resources such as CPU execution cycles or memory. In some embodiments, operating platform 130 provides an application allowing telephone calls over an IP network or over a cellular network and in such embodiments, application framework layer 250 may include telephony manager 256 that provides functionality to the telephone application.

In some embodiments, system layer 230 includes three sublayers, library layer 260, hardware abstraction layer 280, and kernel layer 290. In some embodiments, library layer 260 includes one or more libraries that provide common functionality to applications within application layer 240 or services or managers located within application framework layer 250. For example, library layer 260 can include database libraries 262 which provide libraries for accessing and utilizing databases executing on operating platform 130. Library layer 260 can also include Internet libraries 264 which can provide functionality to application layer 240 or application framework layer 250 for using Internet protocols. According to some embodiments, library layer 260 can also include graphics library 266 which can provide functionality for rendering graphics on the display of the device executing operating platform 130. Common libraries 268 can include, for example, common functionality that may be used by application layer 240 or application framework layer 250. Such common functionality might include, for example, interprocess communication libraries, input/output libraries, or data management libraries. In some embodiments, library layer 260 can include runtime 270. Runtime 270 may include core libraries 273 and virtual machines 277 which provide functionality to the computing device executing operating platform 130 to execute services, managers (in application framework layer 250) and applications (in application layer 240). For example, in some embodiments, applications within application layer 240 may execute on in one or more virtual machines, and in such embodiments, these one or more virtual machines may be located within runtime 270 of library layer 260.

In some embodiments, system layer 230 of operating platform 130 includes hardware abstraction layer 280. Hardware abstraction layer 280 can provide, in some embodiments, an abstraction layer between the physical hardware of the computing device executing operating platform 130 and the software running on the computing device. According to some embodiments, hardware abstraction layer 280 can include a hardware access library that allows access to the physical hardware of the computing device including for example, input/output devices such as displays, networking components, Bluetooth functionality, and the like.

System layer 230 can also include kernel layer 290. Kernel layer 290 can provide functionality for the central core of operating platform 130. For example, kernel layer 290 can provide functionality for managing startup of operating platform 130, input/output requests from application layer 240 and application framework layer 250 (e.g., via drivers 292), management of process start-up and termination (via process management 296), management of power (via power management 294), and management of memory operations (via memory management 298). In some embodiments, application layer 240 and application framework layer 250

With reference back to FIG. 1A, user computer system 120 can also include hardware and I/O devices 135. Hardware and I/O devices 135 can include hardware components of user computer system 120 which provide input and output to users, or perform functional operations of user computer system 120 (e.g., processors, memory, buses). Examples of hardware and I/O devices 135 are described below with respect to FIG. 9.

In some embodiments, applications accessible by user computer system 120 may execute on remote computer system 160. In such embodiments, herein referred to as a "split architecture" for ease of discussion only, the applications may interact with hardware and I/O devices 135 of user computer system 120 while remote computer system 160 performs application processing. In some split architecture embodiments, framework layer 220 functionality of operating platform 130 is performed on remote computer system 160 while system layer 230 functionality is performed on user computer system 120. One advantage of using a split architecture is that version control for applications and services can be localized to remote computer system 160 as opposed to be distributed across multiple user computer systems 120. Another advantage can be that remote computer system 160, which may be a server or computing cluster in some embodiments, may have more processing power than what is available on user computing device 120, which may be a mobile computing device or smartphone is some embodiments.

To accommodate a split architecture, user computer system 120 may use a middleware interface. The middleware interface can be implemented, in some embodiments, through server stub 140, middleware driver 145, and client proxy 150. In some embodiments, server stub 140 exposes functions or methods that when called invoke a call to access hardware and I/O devices 135. For example, server stub 140 may expose a method called "drawImage" for displaying graphics on a touchscreen display of user computer system 120. When the "drawImage" function is called, server stub 140 may perform operations to access a driver for the touchscreen display of user computer system 120 so that the touchscreen display renders an image according to the parameters of the "drawImage" function. In some embodiments, server stub 140 may make a call to hardware abstraction layer 280, which in turn makes a call to a driver to access the hardware.

According to some embodiments, the middleware interface may also includes client proxy 150. Client proxy 150 can expose functions or methods that when called invoke a call to a corresponding function or method of server stub 140. For example, client proxy 150 may include a function called "drawImageProxy" that when called invokes a "drawImage" function in server stub 140. In some embodiments, applications or services executing on operating platform 130 of user computer system 120 can call the functions or methods of client proxy 150 to access functionality of hardware and I/O devices 135, which may occur indirectly through a subsequent call to server stub 140 by client proxy 150 in some embodiments. For example, an application executing on user computer system 120 may make a call to a service of operating platform 130. The service may then make a call on a function of client proxy 150, such as "drawImageProxy." When client proxy 150 receives the call, it may invoke a corresponding function in server stub 140, such as "drawImage." Server stub 140 may then access hardware and I/O devices through a driver or through a hardware abstraction layer depending on the embodiment.

To facilitate application processing on remote computer system 160, the middleware interface can also include middleware driver 145. Middleware stub 145 can expose functions and operations for accessing hardware and I/O devices 135 of user computer system 120 through client proxy 150 and server stub 140. According to some embodiments, middleware driver 145 may communicate with agent 125 to facilitate communication with remote computer system 160. For example, agent 125 may expose or communicate an API for middleware driver 145 to remote computer system 160. When a function or method of middleware driver 145 is invoked, it may in turn invoke a function or method on client proxy 150.

The use of middleware driver 145 provides an additional layer of abstraction to hardware and I/O devices 135. One advantage is that should the API of client proxy 150 change, processes executing on remote computer system 160 need not change calls to middleware driver 145 because middleware driver 145 can expose a consistent API make any necessary adjustments to function calls of client proxy 150. Thus, applications executing on remote computer system 160 need not be updated on an update to the API of client proxy 150 (or server stub 140 or the hardware abstraction layer).

Another advantage is providing stronger encapsulation. For example, functionality for communicating with agent 125 can be localized to middleware driver 145 without including it in client proxy 150. As noted above, client proxy 150 may receive calls originating from applications executing locally on user computing device 120 or calls originating from applications executing on remote computing system 160. Thus, client proxy 150 need not include functionality for communicating with agent 125 as that may not be needed.

In some embodiments, remote computer system 160 may include one or more virtual computing environments 170. Virtual computing environment 170 can include, for example, a virtual computing system that executes operating platform 130. Virtual computing environment 170 may also include one or more applications that interact with hardware and I/O devices 135 of user computer system 120 in a split architecture via the middleware interface. For example, virtual computing environment 170 may include an augmented reality application that annotates images. The augmented reality application may be computationally intensive and require processing power beyond the capabilities of user computer system 120. As a result, such processing may occur on remote computer system 160 which can be a server or cluster computer in some embodiments. The augmented reality application may need to access a camera and be responsive to touch screen input events detected by the touchscreen of user computer system 120. As a result, the augmented reality application may process the application and access the camera and touchscreen of user computer system 120 through the middleware interface (e.g., server stub 140, middleware driver 145, and client proxy 150) and agent 125.

Remote computer system 160 can include multiple virtual computing environments 170, where each virtual computing environment 170 includes an instance of operating platform 130 and one or more applications executing on operating platform 130. In such embodiments, remote computer system 160 may be in communication with the plurality of user computer systems.

Figure 1B:
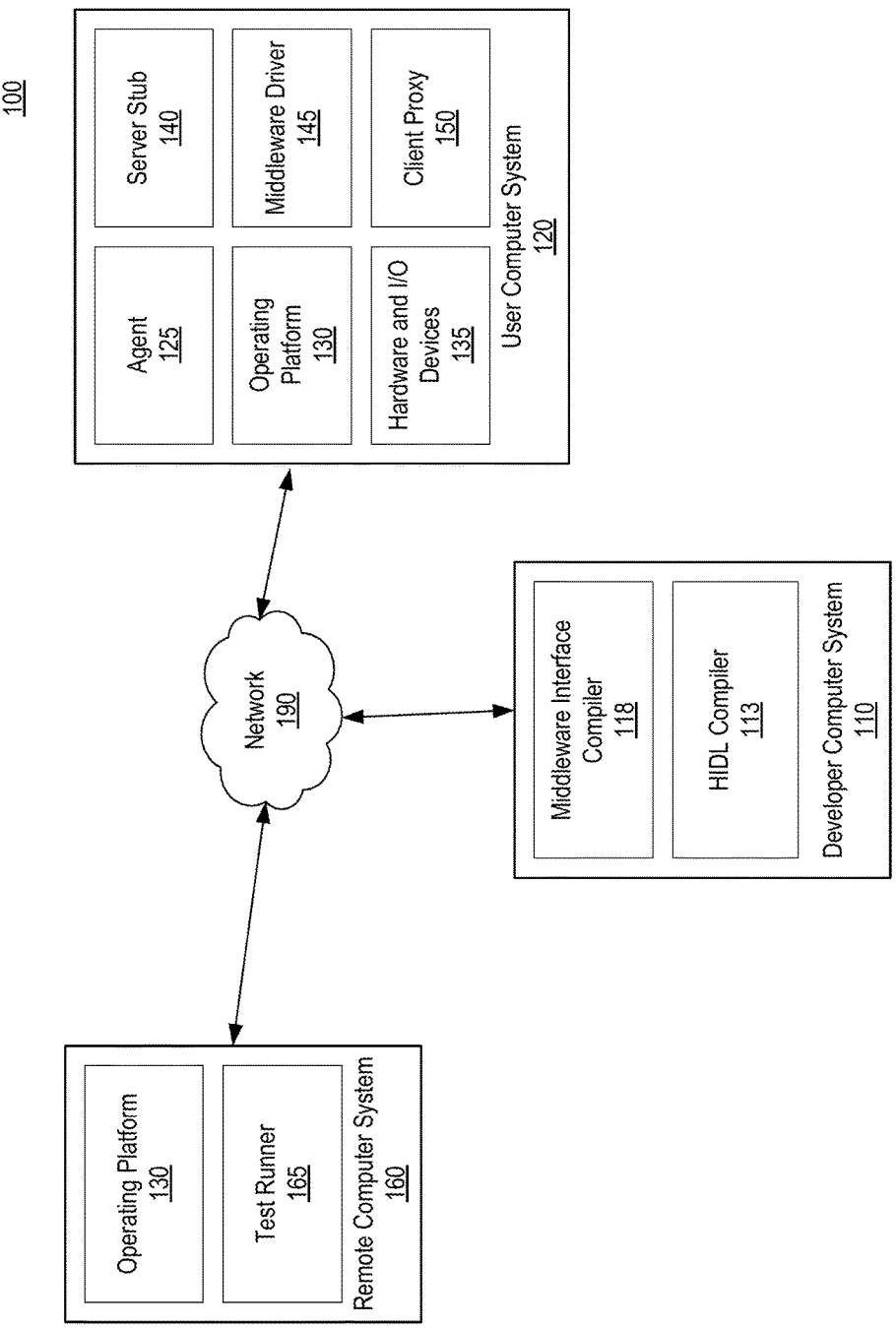

In some embodiments, remote computer system 160 may execute operating platform 130 outside of a virtual computing environment. For example, as shown in FIG. 1B, remote computer system 160 includes operating platform 130 and does not include virtual computing environment 170. In such embodiments, remote computer system 160 similarly can communicate with hardware and I/O devices 135 of user computer system 120 via the middleware interface and agent 125.

According to some embodiments, remote computer system 160 includes test runner 165. When testing operating platform 130 of user computer system 120, test runner 165 may use one or more test suites. But, the point of entry for these test suites is typically in either application layer 240 or application framework layer 250 because testing generally occurs on devices that are ready for user use, and access to system layer 230 may be prevented. As a result, if the execution of a test case on operating platform results in a defect, it may be difficult to identify the location of the fault causing the defect within operating platform 130. For example, if a test case makes a call on an application that uses telephony resources, and the test case triggers a defect, it may be difficult to determine whether the fault causing the defect is located within application layer 240 (or provided applications 242), within application framework layer 250 (or within telephony manager 256), within library layer 260 (or one of common libraries 268, core libraries 273, virtual machines 277), within hardware abstraction layer 280, or kernel layer 290.

Accordingly, test runner 165 can perform functions and operations that access functionality of hardware and I/O devices 135 of user computer system 120 using the middleware interface and agent 125 independently from the framework layer 220 of operating platform 130. In some embodiments, test runner 165 can bypass framework layer 220 of operating platform 130 to test system layer 230 of operating platform 130 independently from framework layer 220. For example, test runner 165, via agent 125, can invoke a function in middleware driver 145, which in turn will invoke a function in client proxy 150, which will in turn invoke a function and server stub 140, which invokes a function to access hardware and I/O devices 135. In such an example, hardware and I/O devices 135 were accessed without the use of the framework layer 220 of operating platform 130.

One advantage of using test runner 165 to access system layer 230 of operating platform 130 is that the lower level functionality of operating platform 130 in system layer 230 can be tested independently of the upper layer functionality of operating platform 130. As operating platform 130 can be an open source platform in some embodiments, manufacturers of computing devices running operating platform 130 may make modifications to the source code of operating platform 130 to accommodate for the specific hardware components of the computing devices they manufacture and sell. Such modifications are typically tested on user ready devices and as noted above, system layer 230 may not be directly accessible. The use of test runner 165 and the middleware interface can improve fault localization in some embodiments since faults detected using test runner 165 would be in system layer 230 as test runner 165 bypasses framework layer 220.

Depending on the embodiment, network 190 can include one or more of any type of network, such as one or more local area networks, wide area networks, personal area networks, telephone networks, and/or the Internet, which can be accessed via any available wired and/or wireless communication protocols. For example, network 190 can comprise an Internet connection through which user computer system 120 and remote computer system 160 communicate. Any other combination of networks, including secured and unsecured network communication links are contemplated for use in the systems described herein.

Figure 3:
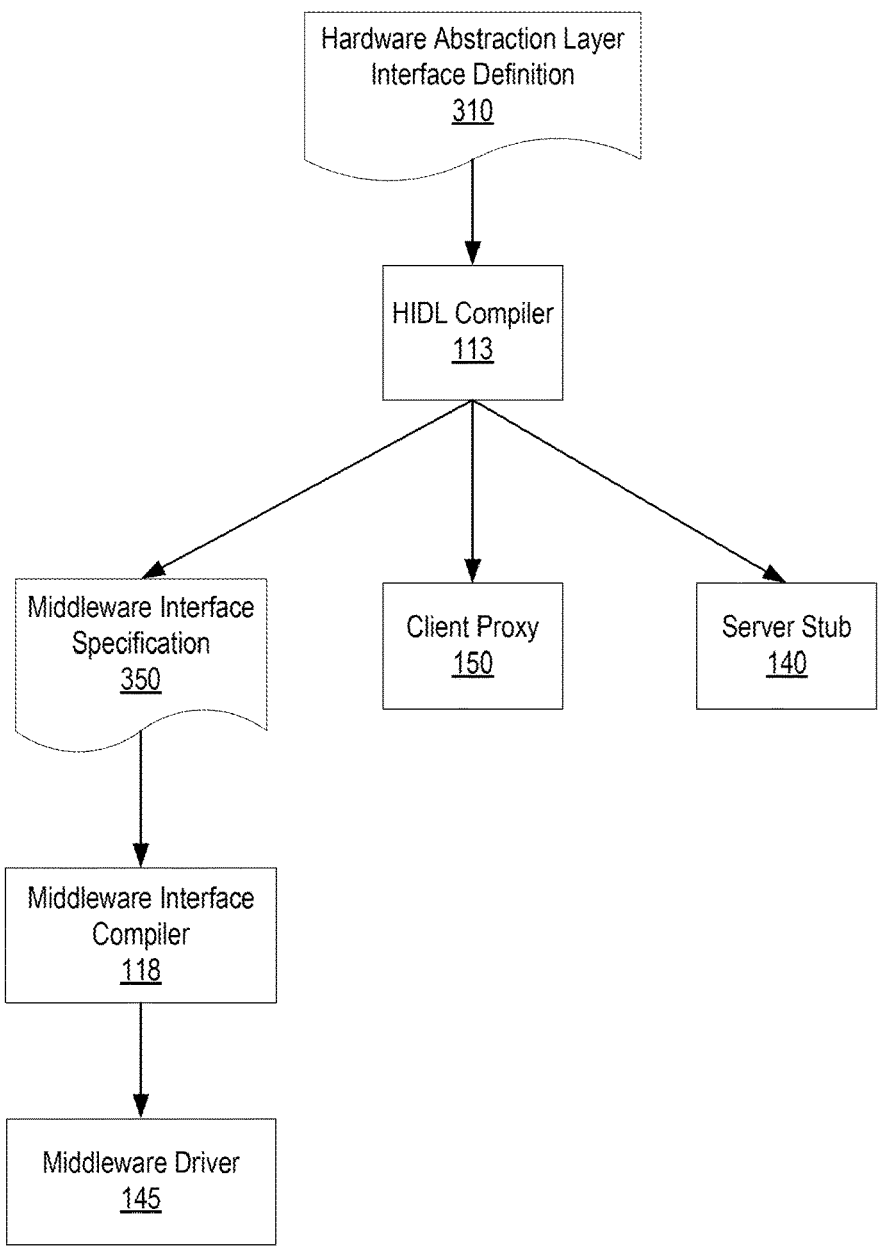
FIG. 3 shows a data flow diagram for middleware interface generation consistent with disclosed embodiments.

FIG. 3 shows a data flow 300 for middleware interface generation consistent with disclosed embodiments. Data flow 300 begins with HIDL compiler 113 accepting as input hardware abstraction layer interface definition file 310. Hardware abstraction layer interface definition file 310 can be a text file including HIDL. HIDL can be, in some embodiments, an interface definition language that can describe functions used to access functionality provided by a hardware abstraction layer. In some embodiments, HIDL allows for function definitions including parameters that are passed into the function, values that are returned from the function, and function names. In some embodiments, HIDL also allows for in-line comments that are not processed by HIDL compiler 113. In some embodiments, hardware abstraction layer interface definition file 310 can include definitions of functions for accessing drivers, hardware directly, or the hardware abstraction layer depending on the embodiment.

According to some embodiments, HIDL allows for definitions of control flows between functions. A control flow can include a series of function calls starting with an entry function and ending with a terminal function. In some embodiments, control flows can correspond to operations and functionality available through the hardware abstraction layer. In some embodiments, hardware abstraction layer interface definition file 310 can include flags or tags to indicate entry functions, terminal functions, and the functions that are part of a control flow.

In some embodiments, HIDL allows for the definition of normal values for functions. Normal values can include, for example, typical data values for a function or boundary condition values for a function. In some embodiments, normal values can be used for testing purposes. As described in greater detail below, in some embodiments, test runner 165 can reflectively create test cases. In such embodiments, normal values can be used by test runner 165 to create sample input to provide to test cases it generates.

According to some embodiments, once HIDL compiler 113 reads and compiles hardware abstraction layer interface definition file 310, it outputs middleware interface specification file 350, client proxy 150, and server stub 140. As described above, server stub 140 and client proxy 150 are part of the middleware interface providing access to hardware and I/O devices of a user computer system. Middleware interface specification file 350 can include function definitions, control flows, entry function identifications, terminal function identifications, and normal values for functions that are part of the middleware interface. In some embodiments, middleware interface specification file 350 is formatted such that middleware interface compiler 118 can accept it as input and read it, although middleware interface specification file may not include human readable text. In some embodiments, however, middleware interface specification file may be human readable allowing for developers to modify middleware interface specification file 350 after his been output by HIDL compiler 113 and before is provided as input to middleware interface compiler 118.

Data flow 300 continues where middleware interface compiler 118 generates middleware driver 145 from middleware interface specification file 350. As noted above, middleware driver 145 is part of the middleware interface and according to some embodiments, communicates with agent 125 providing access for remote computer devices to the hardware and I/O devices of a user computer system.

Figure 4A:
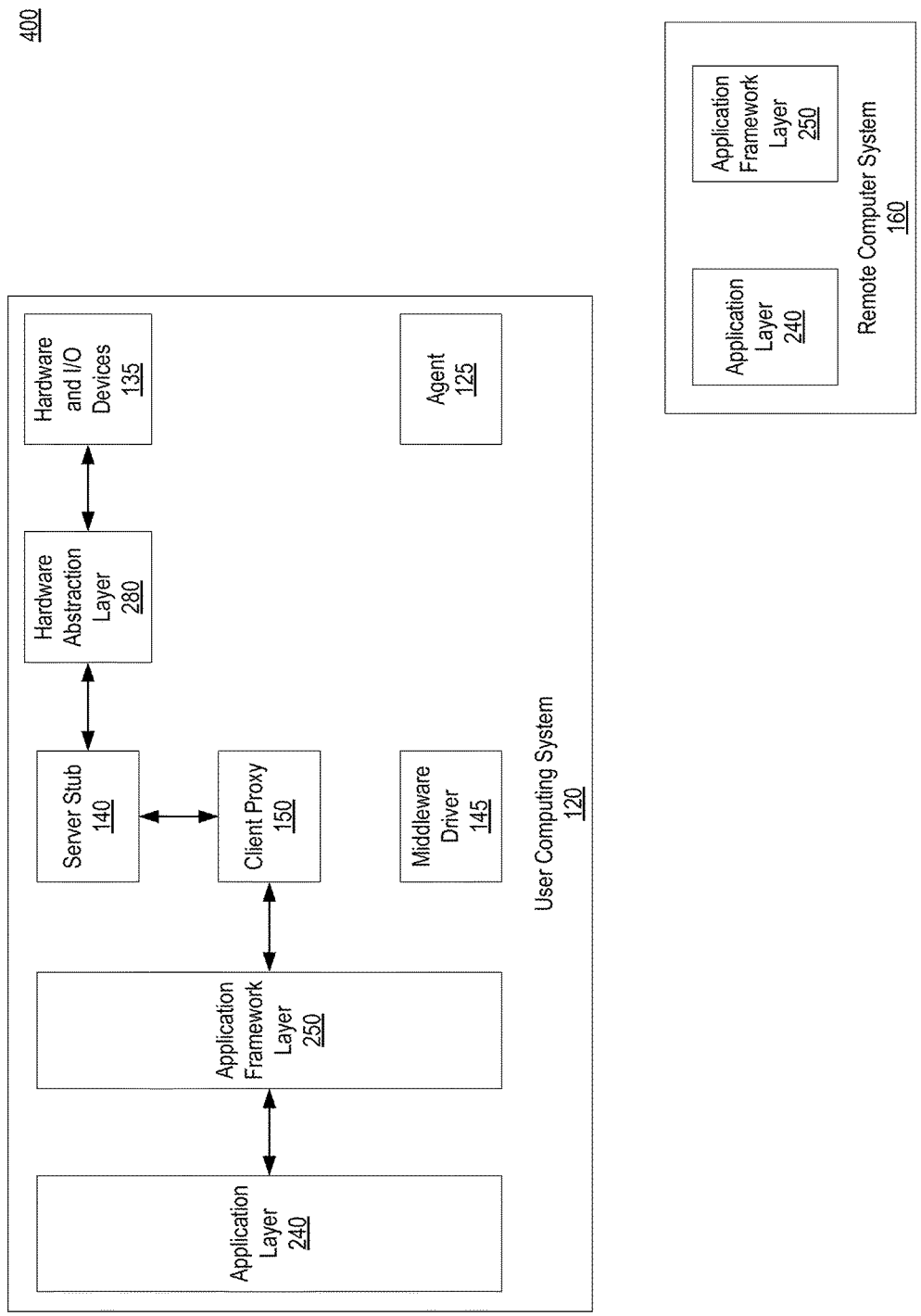
FIGS. 4A-4B show a block diagrams for middleware interface use consistent with disclosed embodiments.
Figure 4B:
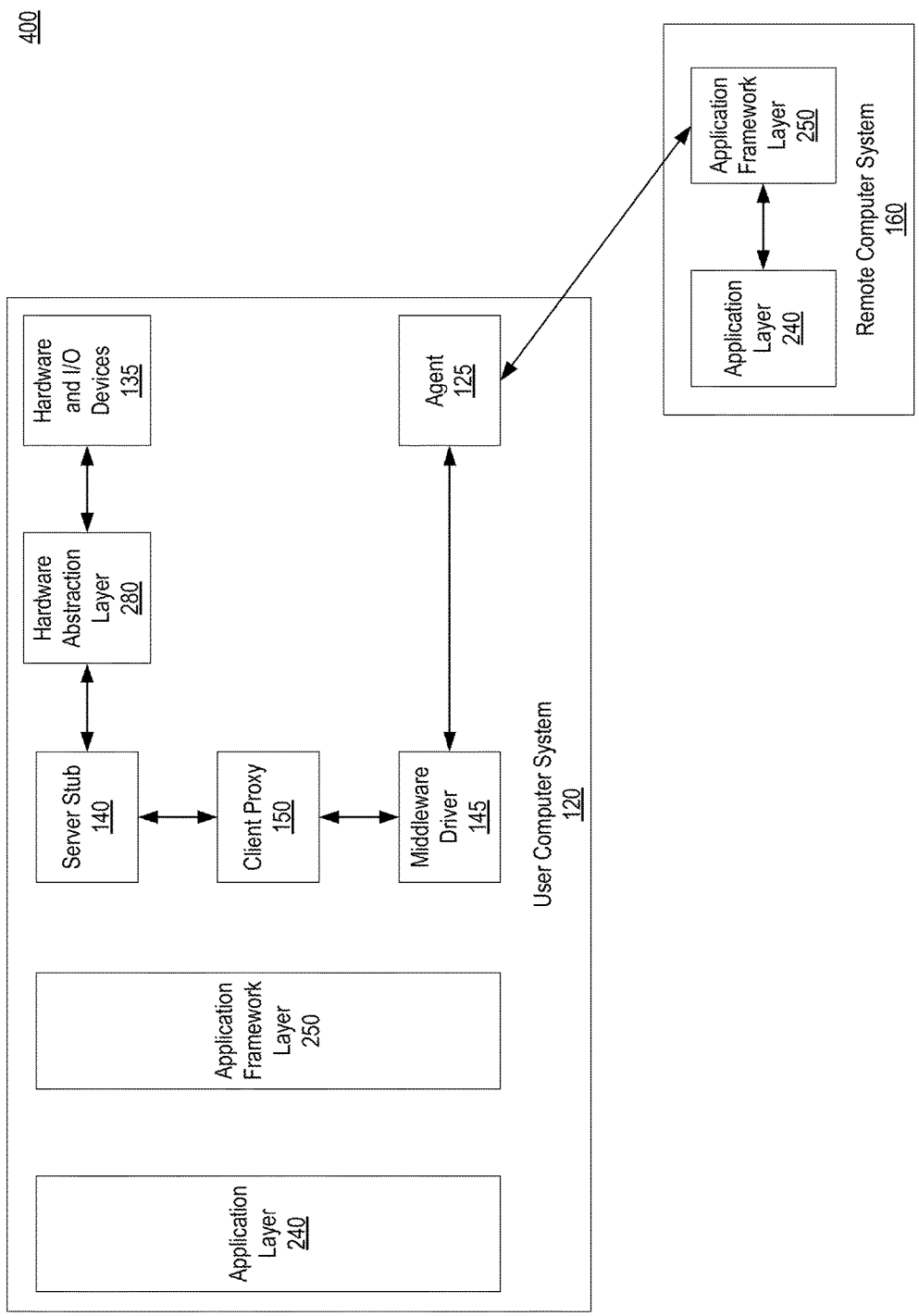

FIGS. 4A and 4B show block diagram 400 for the flow of operations between components of user computing system 120 and remote computer system 160 during middleware interface operation according to some embodiments. FIG. 4A shows the flow of operations for accessing hardware and I/O devices 135 of user computer system 120 from an application executing locally on user computer system 120. FIG. 4B, on the other hand, shows the flow of operations for accessing hardware and I/O devices 135 of user computer system 120 from an application executing on remote computer system 160 in a split architecture embodiment.

In FIG. 4A, an application executed by user computer system 120 may reside in application layer 240 of the user computer system 120. To communicate with hardware and I/O devices 135, code in application layer 240 invokes a function or method in application framework layer 250. For example, an application in application layer 240 may make a call on the API of a service in the application framework layer 250. Responsive to the invocation of the function by application layer 240, application framework layer 250 may invoke a corresponding function call on client proxy 150. Client proxy 150 may, in turn, invoke a corresponding function call on server stub 140, and server stub 140 may make a call to hardware abstraction layer 280 to access functionality of hardware and I/O devices 135.

According to some embodiments, the flow of operations is bidirectional—applications in application layer 240 may make calls through the operation flow to hardware and I/O devices 135, and hardware and I/O devices 135 invoke functionality of the application through the same operational flow going in the other direction. In some embodiments, hardware and I/O devices 135 invoke functionality of application layer 240 using a callback invocation, either synchronous or asynchronous, or through return values corresponding to functions that are part of the hardware abstraction layer. For example, a touchscreen event may register a callback to an event handler in application layer 240 that performs some function in response to the touchscreen event occurring. In such an embodiment, a touchscreen event may be detected by hardware and I/O devices 135 resulting in a callback function being invoked in hardware abstraction layer 280. In an asynchronous call back, for example, the callback function invocation in hardware abstraction layer 280 may result in a call to server stub 140. Server stub 140 may make a corresponding function call on client proxy 150. Client proxy 150 may invoke a callback function on application framework layer 250, which in invokes a call to the event handler in the application layer 240, and the application may execute or perform functionality in response.

In FIG. 4B, an application executed by remote computer system 160 may reside in application layer 240 of remote computer system 160. The flow of operations in FIG. 4B is similar to the flow of operations in FIG. 4A except that the flow of operations for FIG. 4B includes agent 125 and middleware driver 145. When application layer 240 of remote computer system 160 needs to access hardware and I/O devices 135 of user computer system 120, code in application layer 240 invokes a function or method in application framework layer 250. Responsive to the invocation of the function by application layer 240, application framework layer 250 may invoke a corresponding function call on middleware driver 145 via agent 125. Middleware stub 145 may then make a corresponding call on client proxy 150. Client proxy 150 may then, in response, invoke a corresponding function call on server stub 140, and server stub 140 may make a call to hardware abstraction layer 280 to access functionality of hardware and I/O devices 135 of user computer system 120. Like the operational flow described with respect to FIG. 4A, the operational flow described in FIG. 4B may also be bidirectional depending on the embodiment. For example, input events registered by hardware and I/O devices 135 of user computer system 120 may initialize the operational flow and application of application layer 240 of remote computer system 160 may receive notification of the input event.

Figure 5:
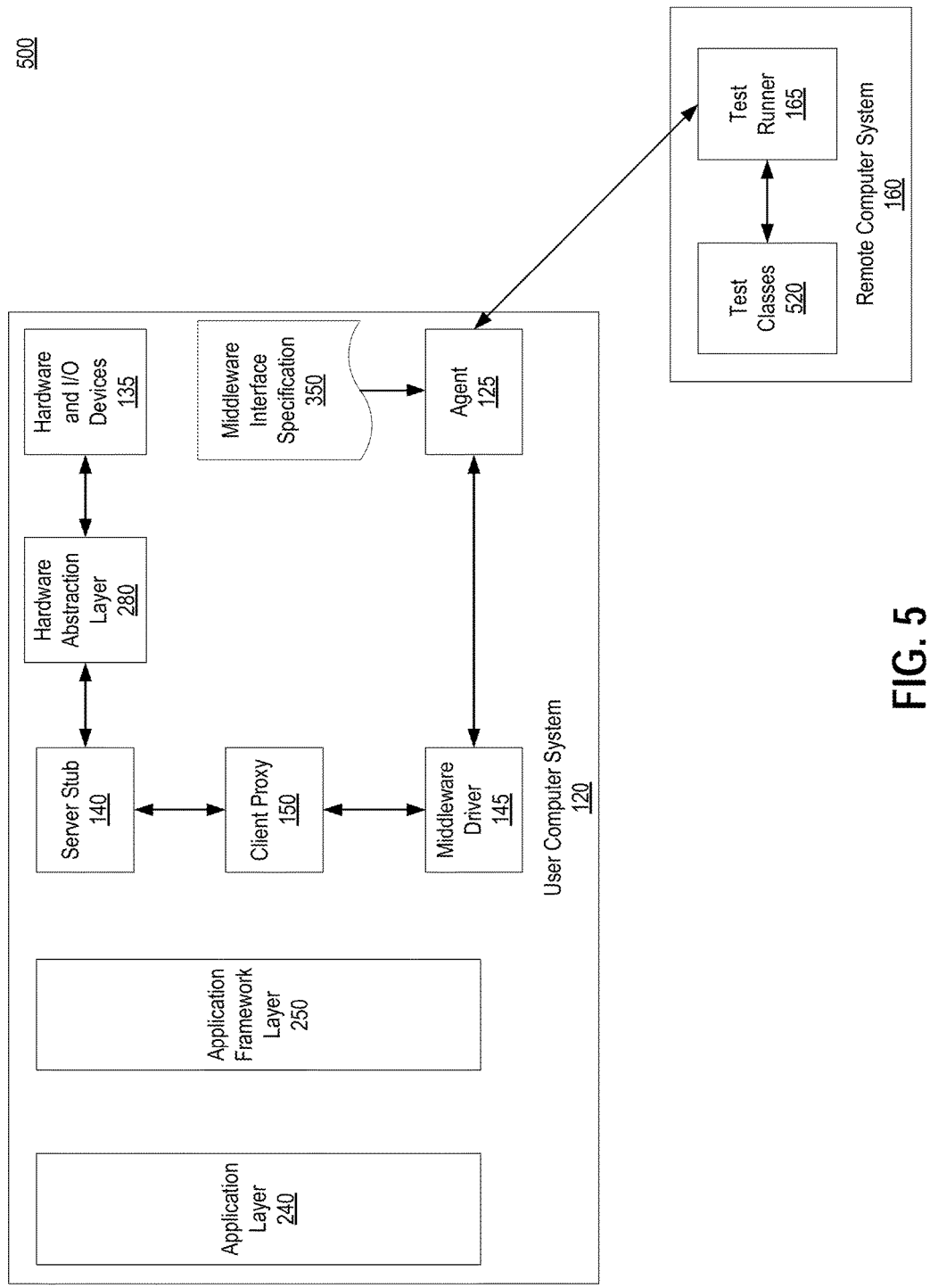
FIG. 5 shows a block diagram for testing an operating platform using a middleware interface consistent with disclosed embodiments.

FIG. 5 shows a block diagram 500 for the flow of operations when using the middleware interface in a testing embodiment. As shown in FIG. 5, remote computer system 160 includes test runner 165. Test runner 165, in some embodiments, can reflectively create and instantiate test classes 520 based on information in the middleware interface specification file 350. According to some embodiments, agent 125 provides middleware interface specification file 350 to test runner 165. Agent 125 may provide middleware interface specification file 350 to test runner 165 after middleware interface compiler 118 creates it, or at a later time. In some embodiments, middleware interface specification file 350 for a particular hardware abstraction layer may be deployed to user computer system with the other components of the middleware interface (e.g., server stub 140, middleware driver 145, and client proxy 150).

As described above, middleware interface specification file 350 can include the definitions of functions that are part of the middleware interface specification (e.g., the functions exposed by middleware driver 145, client proxy one or 50, and server stub 140). Middleware interface specification file 350 can also include control flows, identification of entry functions, identification of terminal functions, and normal values. In some embodiments, middleware interface specification file 350 can include an API specification (e.g., describing names of functions, arguments to those functions, and their return values) and a data specification (e.g., data types such as struct, vector, scalar, array, etc.) In some embodiments, the middleware interface specification file can be written in a known scripting or programming language (e.g., Python, Perl) that can be executed by test runner 165 consistent with disclosed embodiments.

In some embodiments, test runner 165 can use this information to create test classes 520. For example, test runner 165 can create test classes using reflection that invokes the entry function of a control flow and provides input to the entry function the based on normal values associated with it in the middleware interface specification file 350. And, as the middleware interface specification file 350 includes the terminal function of the control flow, it can also create code for test classes 520 that receive return values from the terminal function and compare it to the normal values in the middleware interface specification file 350 associated with the terminal function.

For example, the hardware abstraction layer for the camera of user computer system 120 may have functions related to taking, editing, and saving photos called "takeSnapshot," "editSnapshot," and "saveSnapshot." In the example, one use case results in a control flow of takeSnapshot calling editSnapshot, and editSnapshot calling saveSnapshot. The takeSnapshot may receives parameters X, Y, and Z and saveSnapshot may return a boolean value corresponding to whether the method call was successful. Accordingly, the HIDL for the camera hardware abstraction layer will include a function definition for takeSnapshot with parameters X, Y, and Z, a function definition for editSnapshot, a function definition for saveSnapshot with a return parameter of W, a control flow with takeSnapshot as the entry function and saveSnapshot as the terminal function, and normal values of A, B, and C for takeSnapshot (corresponding with parameters X, Y, and Z) and "true" for saveSnapshot (corresponding with parameter W). When HIDL compiler 113 process the HIDL for the camera hardware abstraction layer, HIDL compiler 113 may output server stub 140 and client proxy 150 with functions corresponding to takeSnapshot, editSnapshot, and saveSnapshot. HIDL compiler 113 will also output middleware interface specification file 350 which will also include definitions of takeSnapshot, editSnapshot, and save Snapshot, the control flow, and the normal values for the functions. Agent 125 can pass middleware interface specification file 350 to test runner 165. Test runner 165 can read middleware interface specification file 350 and create a test class 520 that includes a call to takeSnapshot and use normal values A, B, and C when running the test class corresponding to the takeSnapshot function. Test class 520 may also include code to handle any return value from saveSnapshot and compare it to W.

Similar to the embodiments described with respect to FIG. For 4A and 4B, the flow of operations shown in block diagram 500 can be bidirectional, in some embodiments.

Figure 6:
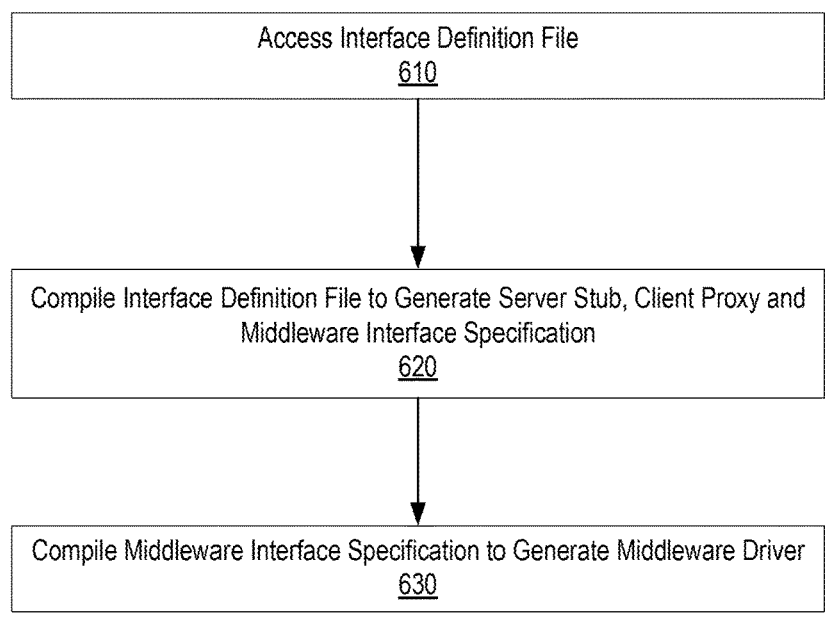
FIG. 6 shows a flowchart for a process for middleware interface generation consistent with disclosed embodiments.

FIG. 6 shows a flowchart representing an example middleware interface generation process 600 that may be performed by one or more components of developer computer system 110 such as HIDL compiler 113 and middleware interface compiler 118. Although the following discussion describes middleware interface generation process 600 as being performed by developer computer system 110, other computer systems or other components of other computer systems can perform middleware interface generation process 600 without departing from the spirit and scope of the present disclosure.

Middleware interface generation process 600 begins at step 610 where an HIDL compiler accesses an interface definition file. The interface definition file can be a file written in HIDL in some embodiments. Consistent with disclosed embodiments, the HIDL compiler will then compile the interface definition file to generate a server stub, a client proxy, and a middleware interface specification file at step 620. At step 630, a middleware interface compiler may compile the middleware interface specification to generate a middleware driver, consistent with disclosed embodiments.

Figure 7:
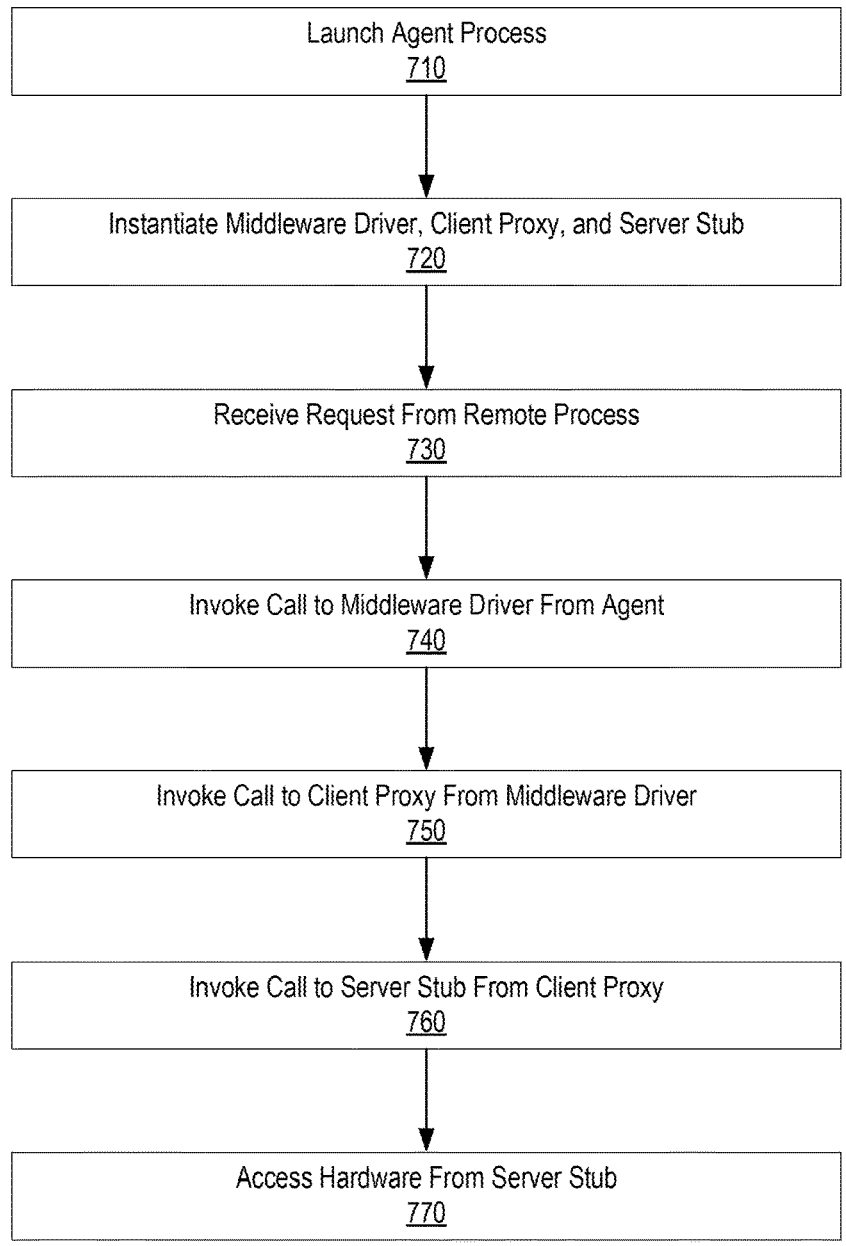
FIG. 7 shows a flowchart for a process for middleware interface use consistent with disclosed embodiments.

FIG. 7 shows a flowchart for a middleware interface use process 700 that may be performed by user computer system 120. Although the following discussion describes middleware interface use process 700 as being performed by user computer system, components of a remote computer system (such as remote computer system 160) may perform some or all steps of middleware interface use process 700 without departing from the spirit and scope of the present disclosure.

Middleware interface use process 700 begins at step 710 where the user computer system launches a process corresponding to the agent. After launching the agent process, the user computer system instantiates the middleware driver, the client proxy, and the server stub (at step 720) consistent with disclosed embodiments. At step 730, the user computer system receives a request from a remote process, and in some embodiments, the request from the remote process may received the agent process launched in step 710. At step 740 the agent may invoke a call to the middleware driver based on the received request from the remote process. The middleware driver may invoke a corresponding call to the client proxy at step 750, and the client proxy may invoke a call to the server stub at step 760. Responsive to receiving the call from the client proxy, the server stub access hardware at step 770. As described above, and consistent with disclosed embodiments, server stub may access the hardware via hardware abstraction layer.

Figure 8:
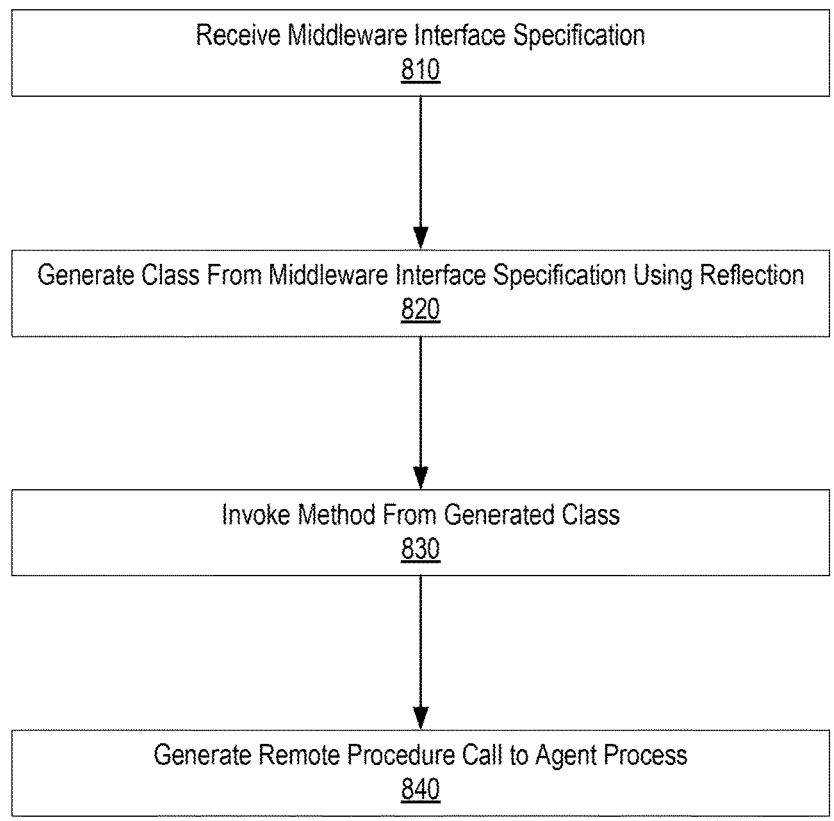
FIG. 8 shows a flowchart for a process for testing an operating platform using a middleware interface consistent with disclosed embodiments.

FIG. 8 shows a flowchart for testing process 800 for testing an operating platform using a middleware interface consistent with disclosed embodiments. According to some embodiments, testing process 800 may be performed by a test runner component such as test runner 165 of remote computer system 160 for example. Although the following discussion describes testing process 800 as being performed by a test runner, other components of a computer system configured to perform testing of an operating platform can perform testing process 800 without departing from the spirit and scope of the present disclosure.

Testing process 800 begins at step 810 where the test runner receives a middleware interface specification file. The test runner may receive the middleware interface specification file via an agent executing on a user computing device connected with a remote computing device. At step 820, the test runner may generate a test class from the middleware interface specification using reflection. Once the test classes have been generated and instantiated, test runner 165 may invoke one of the methods from the generated test class at step 830. Once invoking the method of the generated test class, the test runner may initiate remote procedure call to an agent process executing on a user computing device connected with the remote computing device executing the test runner.

Figure 9:
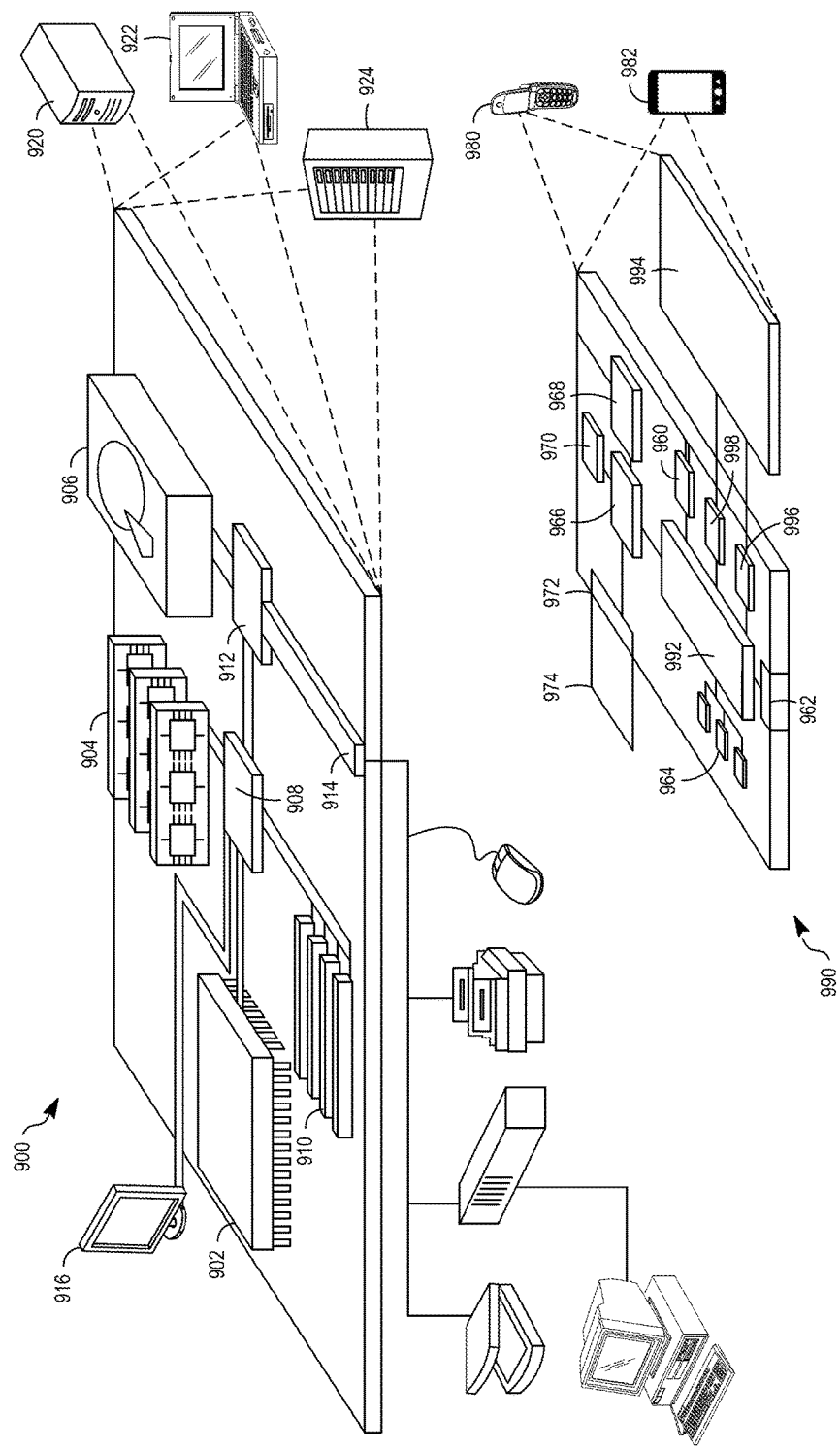
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, tablets, workstations, personal digital assistants, televisions, servers, blade servers, mainframes, and other appropriate computing devices. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. The processor 902 can be a semiconductor-based processor. The memory 904 can be a semiconductor-based memory. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The algorithms and systems presented herein are not inherently related to any particular computer or other apparatus. Various general purpose systems may be used with programs in accordance with the teachings herein, or it may prove convenient to construct a more specialized apparatus to perform the required method steps. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other implementations will be apparent to those of skill in the art upon reading and understanding the above description. The scope of the disclosure should, therefore, be determined with reference to the aspects enumerated below, along with the full scope of equivalents to which such aspects are entitled.

What is claimed is:

1. A method for creating a middleware interface for an operating platform, the method comprising:
   accessing a file describing an interface definition;
   generating a server stub for communicating with a hardware access library of the operating platform based on the interface definition, the hardware access library providing access to hardware of a computing device executing the operating platform;
   generating a client proxy for communicating with the server stub based on the interface definition;
   generating a middleware interface specification based on the interface definition, the middleware interface specification including one or more control flows, the one or more control flows including function operation descriptions for allowing a process to access the hardware of the computing device; and,
   generating, using the middleware interface specification, a middleware driver for communicating with the client proxy, the middleware driver also in communication with an agent for receiving communications from a plurality of processes,
   wherein at least one of the plurality of processes are executed by a remote computer system different from the computer device.

2. The method of claim 1 wherein the operating platform includes the agent.

3. The method of claim 1 wherein at least one of the plurality of processes are executed on the computing device.

4. The method of claim 1 wherein a first complier performs generating the server stub, generating the client proxy and generating the middleware interface specification.

5. The method of claim 4 wherein a second complier performs the generating the middleware driver.

6. The method of claim 1 further comprising deploying the server stub, the client proxy, and the middleware driver to the computing device executing the operating platform.

7. The method of claim 1 wherein the operating platform is an open source platform.

8. A computer program product comprising a non-transitory storage medium, the computer program product including code that, when executed by processing circuitry of a sound rendering computer configured to create a middleware interface for an operating platform, causes the processing circuitry to perform a method, the method comprising:
   accessing a file describing an interface definition;
   generating a server stub for communicating with a hardware access library of the operating platform based on the interface definition, the hardware access library providing access to hardware of a computing device executing the operating platform;
   generating a client proxy for communicating with the server stub based on the interface definition;
   generating a middleware interface specification based on the interface definition, the middleware interface specification including one or more control flows, the one or more control flows including function operation descriptions for allowing a process to access the hardware of the computing device; and,
   generating, using the middleware interface specification, a middleware driver for communicating with the client proxy, the middleware driver also in communication with an agent for receiving communications from a plurality of processes,
   wherein a first complier performs generating the server stub, generating the client proxy and generating the middleware interface specification, and
   wherein a second complier performs the generating the middleware driver.

9. The computer program product of claim 8 wherein the operating platform includes the agent.

10. The computer program product of claim 8 wherein at least one of the plurality of processes are executed on the computing device.

11. The computer program product of claim 8 wherein at least one of the plurality of processes are executed by a remote computer system different from the computer device.

12. The computer program product of claim 8 wherein the method further comprises deploying the server stub, the client proxy, and the middleware driver to the computing device executing the operating platform.

13. The computer program product of claim 8 wherein the operating platform is an open source platform.

14. An electronic apparatus configured to create a middleware interface for an operating platform, the electronic apparatus comprising:
   memory; and
   controlling circuitry coupled to the memory, the controlling circuitry being configured to:
   access a file describing an interface definition;
   generate a server stub for communicating with a hardware access library of the operating platform based on the interface definition, the hardware access library providing access to hardware of a computing device executing the operating platform;
   generate a client proxy for communicating with the server stub based on the interface definition;
   generate a middleware interface specification based on the interface definition, the middleware interface specification including one or more control flows, the one or more control flows including function operation descriptions for allowing a process to access the hardware of the computing device; and,
   generate, using the middleware interface specification, a middleware driver for communicating with the client proxy, the middleware driver also in communication with an agent for receiving communications from a plurality of processes,
   wherein at least one of the plurality of processes are executed by a remote computer system different from the computer device.

15. The electronic apparatus of claim 14, wherein the operating platform includes the agent.

16. The electronic apparatus of claim 14, wherein at least one of the plurality of processes are executed on the computing device.

* * * * *